United States Patent
Wang et al.

(10) Patent No.: US 11,974,201 B2
(45) Date of Patent: Apr. 30, 2024

(54) VEHICLE-ROAD COLLABORATION APPARATUS AND METHOD, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Tao Wang, Shenzhen (CN); Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 451 days.

(21) Appl. No.: 17/469,230

(22) Filed: Sep. 8, 2021

(65) Prior Publication Data
US 2021/0409917 A1    Dec. 30, 2021

Related U.S. Application Data

(63) Continuation of application No. PCT/CN2020/102336, filed on Jul. 16, 2020.

(30) Foreign Application Priority Data

Aug. 5, 2019  (CN) .................. 201910718184.8

(51) Int. Cl.
*H04W 8/04* (2009.01)
*G08G 1/09* (2006.01)
(Continued)

(52) U.S. Cl.
CPC .............. *H04W 4/40* (2018.02); *G08G 1/091* (2013.01); *H04W 4/12* (2013.01)

(58) Field of Classification Search
CPC ........... H04W 4/40; H04W 4/44; H04W 4/48; H04W 4/12; G08G 1/091
See application file for complete search history.

(56) References Cited

U.S. PATENT DOCUMENTS

2018/0137693 A1 * 5/2018 Raman .................. G07C 5/008
2018/0307524 A1   10/2018 Vyas et al.
(Continued)

FOREIGN PATENT DOCUMENTS

CN   107341925 A   11/2017
CN   108415944 A    8/2018
(Continued)

OTHER PUBLICATIONS

International Search Report for PCT/CN2020/102336 dated Sep. 30, 2020.
(Continued)

*Primary Examiner* — Moustapha Diaby
(74) *Attorney, Agent, or Firm* — Sughrue Mion, PLLC

(57) ABSTRACT

Embodiments of the disclosure provide a vehicle-road collaboration apparatus and method, an electronic device, and a storage medium. The vehicle-road collaboration apparatus includes a service system, which includes a plurality of microservice modules, and each microservice module is configured to process vehicle-road collaboration data to implement a corresponding service function. Thus, scalability and compatibility of a vehicle-road collaboration system are improved.

20 Claims, 6 Drawing Sheets

Set a plurality of microservice modules, each microservice module being configured to process vehicle-road collaboration data, to implement a service function corresponding to the each microservice module — S701

Store registration information of the microservice module in a main control module, and feed back, according to a call request of a specified microservice module in the plurality of microservice modules, registration information of a called target microservice module to the specified microservice module by using the main control module, for the specified microservice module to call the target microservice module according to the registration information of the target microservice module — S702

(51) Int. Cl.
*H04W 4/12* (2009.01)
*H04W 4/40* (2018.01)
*H04W 8/26* (2009.01)
*H04W 12/06* (2021.01)
*H04W 60/00* (2009.01)
*H04W 60/04* (2009.01)

(56) References Cited

U.S. PATENT DOCUMENTS

| | | | | |
|---|---|---|---|---|
| 2019/0004871 | A1* | 1/2019 | Sukhomlinov | G06F 9/541 |
| 2019/0297150 | A1* | 9/2019 | Takahashi | H04L 67/10 |
| 2020/0142735 | A1* | 5/2020 | Maciocco | H04L 67/1008 |
| 2020/0233650 | A1* | 7/2020 | Rajendran | H04L 67/12 |
| 2021/0199445 | A1* | 7/2021 | Sergeev | B60W 60/001 |

FOREIGN PATENT DOCUMENTS

| | | |
|---|---|---|
| CN | 108594819 A | 9/2018 |
| CN | 109670300 A | 4/2019 |
| CN | 109714358 A | 5/2019 |
| CN | 109862051 A | 6/2019 |
| CN | 110430079 A | 11/2019 |
| JP | 2000-194565 A | 7/2000 |
| JP | 2019-36339 A | 3/2019 |
| KR | 10-2011-0017815 A | 2/2011 |
| KR | 10-2019-0072437 A | 6/2019 |
| WO | 2019/135207 A1 | 7/2019 |

OTHER PUBLICATIONS

Written Opinion for PCT/CN2020/102336 dated Sep. 30, 2020.
Extended European Search Report issued Aug. 29, 2022 in European Application No. 20849860.0.
Khaled Mammou et al., "Binarization of occupancy information in TMC13", International Organisation for Standardisation Organisation Internationale De Normalisation ISO/IEC JTC1/SC29/WG11 Coding of Moving Pictures and Audio, ISO/IEC JTC1/SC29/WG11 MPEG2018/m43592, Jul. 2018, Ljubjana, Slovenia, (7 pages total).
"G-PCC codec description v3", International Organisation for Standardisation Organisation Internationale de Normalisation ISO/IEC JTC1/SC29/WG11 Coding of Moving Pictures and Audio, ISO/IEC JTC1/SC29/WG11 N18486, Mar. 2019, Geneva, CH (51 pages total).
Sébastien Lasserre et al., "Using neighbouring nodes for the compression of octrees representing the geometry of point clouds", Proceedings of the 10th ACM Multimedia Systems Conference, Jun. 18, 2019, pp. 145-153 (9 pages total).
Notification of reasons for refusal dated Oct. 25, 2022 from the Japanese Patent Office in Japanese Application No. 2021-556789.
Translation of Written Opinion of the International Searching Authority dated Sep. 30, 2020 in International Application No. PCT/CN2020/102336.
Communication dated Nov. 10, 2022, issued in Korean Application No. 10-2021-7030925.

* cited by examiner

VEHICLE-ROAD COLLABORATION APPARATUS AND METHOD, ELECTRONIC DEVICE, AND STORAGE MEDIUM

CROSS-REFERENCE TO RELATED APPLICATION(S)

This application is a continuation application of International Application No. PCT/CN2020/102336, filed on Jul. 16, 2020, which claims priority to Chinese Patent Application No. 201910718184.8, filed with the China National Intellectual Property Administration on Aug. 5, 2019, the disclosures of which are incorporated by reference in their entireties.

FIELD

The disclosure relates to the field of computer and communication technologies, and specifically, to a vehicle-road collaboration apparatus and method, an electronic device, and a storage medium.

BACKGROUND

A vehicle-road collaboration system adopts wireless communication and new-generation Internet technologies to comprehensively implement real-time interaction of vehicle-to-vehicle, vehicle-to-road, and other dynamic information, and perform active vehicle safety control and road collaboration management based on acquisition and integration of dynamic traffic information. The vehicle-road collaboration system realizes effective collaboration of people, vehicles and roads, improves traffic safety and traffic efficiency, thereby forming a safe, efficient, and environmentally friendly road traffic system.

The vehicle-road collaboration system provided in the related art typically lacks service governance capabilities, and there is a high degree of dependency between modules. In a future vehicle-road collaboration road deployment scene, it is difficult for such a system to be compatible with multi-supplier road deployment solutions because of fragmentation of road management and road section infrastructure, making it even more difficult to implement efficient and reliable service governance.

SUMMARY

Embodiments of the disclosure provide an apparatus and a method for vehicle-road collaboration, an electronic device, and a storage medium, which may improve scalability and compatibility of a vehicle-road collaboration system.

According to an aspect of the embodiments of the disclosure, a vehicle-road collaboration apparatus is provided, including: a service system including a plurality of microservice modules, each microservice module being configured to process vehicle-road collaboration data, to implement a service function corresponding to each microservice module; and a main control module configured to store registration information of a microservice module, and provide, based on a call request of a certain microservice module in the plurality of microservice modules, registration information of a requested target microservice module to the certain microservice module, wherein the certain microservice module is configured to call the target microservice module based on the registration information of the target microservice module.

According to an aspect of the embodiments of the disclosure, a vehicle-road collaboration method is provided, performed by an electronic device, the method including: setting a plurality of microservice modules, each microservice module being configured to process vehicle-road collaboration data, to implement a service function corresponding to each microservice module; and storing registration information of the microservice module in a main control module, and providing, based on a call request of a certain microservice module in the plurality of microservice modules, registration information of a requested target microservice module to the certain microservice module by using the main control module, wherein the certain microservice module is configured to call the target microservice module based on the registration information of the target microservice module.

According to an aspect of the embodiments of the disclosure, an electronic device is provided, including a processor and a memory, the memory being configured to store a computer program, and the processor being configured to execute the computer program to implement the vehicle-road collaboration method according to the foregoing embodiments.

According to an aspect of the embodiments of the disclosure, a computer-readable storage medium is provided, storing a computer program, the computer program including program instructions, the program instructions, when executed by one or more processors, performing the vehicle-road collaboration method according to the foregoing embodiments.

BRIEF DESCRIPTION OF THE DRAWINGS

Accompanying drawings herein are incorporated into and constitute a part of the disclosure, and are used together with this specification to describe example embodiments of the disclosure. The accompanying drawings in the following descriptions merely describe some example embodiments of the disclosure, and a person of ordinary skill in the art may derive other example embodiments according to the accompanying drawings without creative efforts.

DETAILED DESCRIPTION

Figure 1:
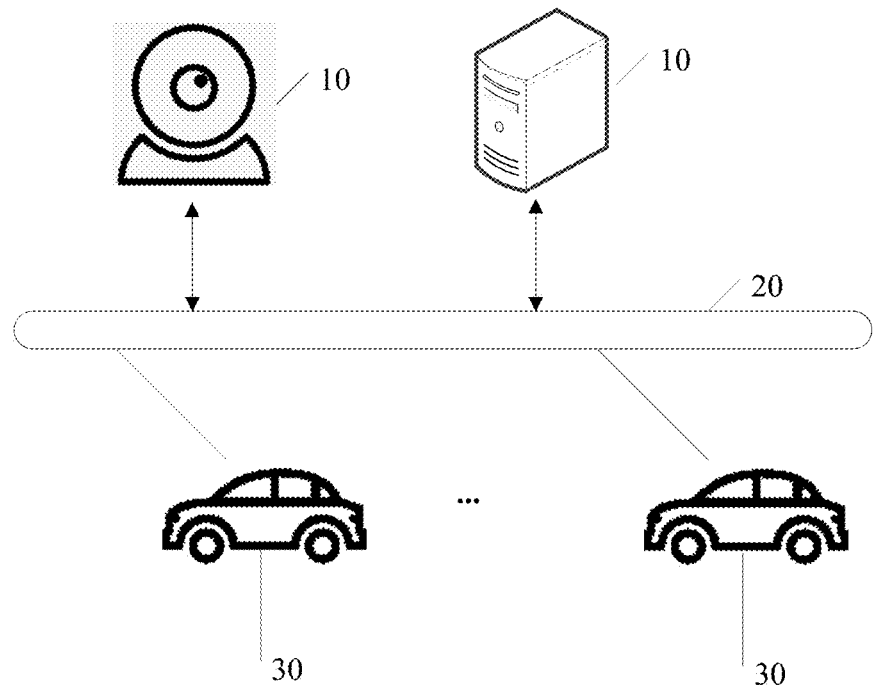
FIG. 1 is a schematic diagram of an application environment of a vehicle-road collaboration system according to an example embodiment of the disclosure.

Example embodiments of the disclosure are described more comprehensively with reference to the accompanying drawings. However, the example embodiments in the disclosure may be implemented in various forms and are not to be understood as being limited to the examples described herein. Conversely, the example embodiments are provided to make the disclosure more comprehensive and complete, and to comprehensively convey the concept of the example embodiments to a person skilled in the art.

In addition, the described features, structures, or characteristics may be combined in one or more embodiments in any appropriate manner. In the following descriptions, specific details are provided to give a full understanding of the embodiments of the disclosure. However, a person skilled in the art is to be aware that, the technical solutions in the disclosure may be implemented without one or more of the particular details, or other methods, components, apparatuses, or steps may be used. In other cases, well-known methods, apparatuses, implementations, or operations are not shown or described in detail, to avoid obscuring the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an execution order of operations/steps may vary depending on an embodiment.

In assisted driving, a vehicle-to-everything (V2X) technology is generally used to obtain target information around a road, that is, a V2X message is broadcast by other vehicles, relevant information is collected, and the assisted driving is implemented based on the information. However, the V2X technology has a problem of low penetration rate, which makes it difficult to function effectively. In addition, in autonomous driving, visual sensing is generally integrated in a vehicle, and recognition, tracking, and positioning of a target around the vehicle are achieved by using a visual sensor on the vehicle, and a traveling route, a control manner, and the like of the vehicle are determined accordingly.

Both the V2X technology and a single-vehicle intelligence technology often have problems such as low penetration rate, insurmountable sensing blind regions, and high costs. For example, the current vehicle-road collaboration system is incompatible with a multi-supplier road deployment solution, making it difficult to implement efficient and reliable service governance. In another example, the current vehicle-road collaboration system generally adopts a Hypertext Transfer Protocol (HTTP) transmission manner to transfer data between some modules. However, such a transmission manner has a large delay and is not suitable for a vehicle-road collaboration system that has a high requirement on delay.

In example embodiments of the disclosure, a microservice architecture may be applied to the vehicle-road collaboration system based on an organization manner of functional modules in the vehicle-road collaboration system. In the microservice-based vehicle-road collaboration system, each functional module may implement message transfer and interface calling between the functional modules through a microservice main control module, and complete integration and adaptation between different functional modules and different solutions, thereby greatly reducing complexity of integration between modules, reducing the implementation costs and the bit error rate, improving the transmission speed, and implementing load balancing and fault-tolerant protection functions based on the microservice architecture. In addition, in the microservice-based vehicle-road collaboration system, the functional modules are divided into microservice modules that are easy to deploy and develop, which may improve security and compatibility.

FIG. 1 is a schematic diagram of an application environment of a vehicle-road collaboration system according to an example embodiment of the disclosure. Referring to FIG. 1, a road monitoring device 10 establishes a connection with an electronic device 30 in a vehicle through a communication bus 20. The road monitoring device 10 may include devices such as a roadside sensor device (for example, a camera, radar, infrared, or another sensor device), a third-party application server, and a user terminal. The electronic device 30 in the vehicle may include an in-vehicle navigation, a smartphone, a tablet computer, a notebook computer, a personal computer (PC), or the like. The road monitoring device 10 processes acquired road information, vehicle information, and other traffic information to obtain vehicle-road collaboration data, and transmits the vehicle-road collaboration data to the electronic device 30 in the vehicle through the communication bus 20. The electronic device 30 processes the vehicle-road collaboration data by using a microservice-based vehicle-road collaboration system, to implement a corresponding service function.

Figure 2:
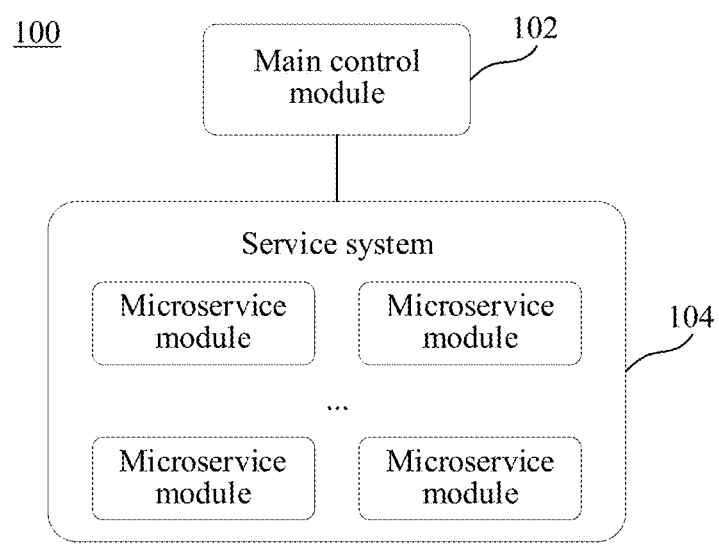
FIG. 2 is a block diagram of a vehicle-road collaboration system according to an example embodiment of the disclosure.

FIG. 2 is a block diagram of a vehicle-road collaboration system according to an example embodiment of the disclosure. Referring to FIG. 2, the vehicle-road collaboration system (also referred to as a vehicle-road collaboration apparatus) 100 includes a main control module 102 and a service system 104.

In an embodiment of the disclosure, the service system 104 includes a plurality of microservice modules, and each microservice module is configured to process vehicle-road collaboration data, to implement a service function corresponding to each microservice module. The main control module 102 is configured to store registration information of the microservice module, and provide (or feed back), according to a call request of a certain (or specified) microservice module in the plurality of microservice modules, registration information of a called target microservice module to the certain microservice module, so that the certain microservice module may call the target microservice module according to the registration information of the target microservice module.

In an embodiment of the disclosure, the main control module 102 may store the registration information of the microservice module when receiving a registration request of the microservice module, the registration information including interface information and routing information of the microservice module.

In this embodiment of the disclosure, because the service system includes a plurality of microservice modules, and each microservice module is configured to process vehicle-road collaboration data to implement a corresponding service function, efficient and rapid deployment of the vehicle-road collaboration system may be achieved in a microservice deployment manner, and effective and diverse service governance may be achieved, thereby improving scalability and compatibility of the system. Meanwhile, decoupling of development and testing may be implemented by modularizing the service system through a microservice manner, which is beneficial to efficient development of the development and testing. In addition, the main control module stores registration information of the microservice module, and feeds back registration information of a called microservice module based on a call request of the microservice module, so that each microservice module in the service system may complete efficient information transfer and interface calling based on the main control module, thereby implementing interaction between different microservice modules.

In an embodiment of the disclosure, the main control module 102 is further configured to perform start and stop management on each microservice module, and update the stored registration information of each microservice module according to a heartbeat message of each microservice module. For example, each microservice module may inform a state thereof to the main control module 102 by transmitting a heartbeat message to the main control module 102. If the main control module 102 does not receive a heartbeat message transmitted by a specific microservice module, it indicates that the microservice module may be faulty, and other microservice modules may be controlled to stop calling the microservice module. In another example, if the main control module 102 detects that registration information of a specific microservice module changes, for example, interface information changes, the main control module 102 may update the registration information in time, so that other microservice modules may accurately call the microservice module.

Figure 3:
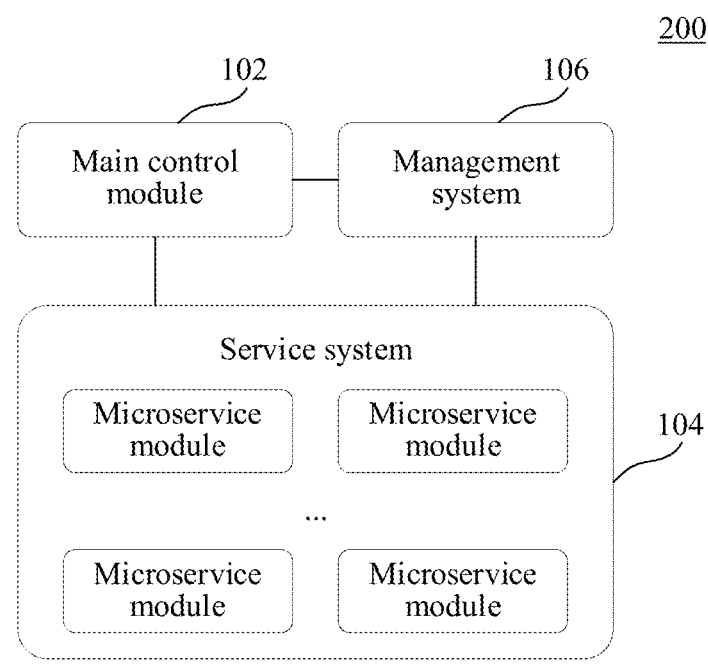
FIG. 3 is a block diagram of a vehicle-road collaboration system according to another example embodiment of the disclosure.

FIG. 3 is a block diagram of a vehicle-road collaboration system according to another example embodiment of the disclosure. As shown in FIG. 3, a vehicle-road collaboration system 200 may further include a management system 106 in addition to the main control module 102 and the service system 104 shown in FIG. 2. The management system 106 may include at least one of the following functional modules: a release management functional module, a configuration center module, a log management module, an indicator statistics collection module, an abnormal information statistics collection module, and a monitoring and management module.

In an embodiment of the disclosure, the release management functional module is configured to manage release of the microservice module. For example, operation and maintenance personnel may release a newly deployed microservice module to the vehicle-road collaboration system through the release management functional module, and the microservice module may be registered with the main control module 102.

In an embodiment of the disclosure, the configuration center module is configured to manage a configuration file of the microservice module, for example, edit the configuration file. The configuration file of the microservice module may include configuration information such as a configuration parameter and a functional property of the microservice module.

In an embodiment of the disclosure, the log management module is configured to provide functions of log recording and log query of the microservice module, for example, record log information such as a call status and a working state of the microservice module, and query a call log and a work log of the microservice module.

In an embodiment of the disclosure, the indicator statistics collection module is configured to collect statistics on call state information detected by the microservice module, for example, collect statistics on traffic consumption, average time consumption, memory usage, a queue size, a cache hit rate, and the like during calling of the microservice module, to give an alert when the microservice module is abnormal.

In an embodiment of the disclosure, the abnormal information statistics collection module is configured to collect statistics on abnormal information detected by the microservice module, where for example, the abnormal information may be service state change information or database access failure information, so that an alert is given when the microservice module is abnormal.

In an embodiment of the disclosure, the monitoring and management module is configured to display a service processing result of the microservice module, to analyze the service processing result. For example, a recognition and positioning result of a recognition and positioning module may be displayed.

Based on the vehicle-road collaboration system shown in FIG. 2 or FIG. 3, in an embodiment of the disclosure, the service system 104 includes a first microservice module for data standardization processing, the first microservice module being configured to obtain vehicle-road collaboration data transmitted by a road monitoring device (including a roadside sensor unit or another device), and convert a format of the vehicle-road collaboration data into a data format supported by the service system 104.

In an embodiment of the disclosure, the roadside sensor unit may include sensor devices such as a camera, radar, and infrared. The another device may be a device such as a third-party application server or a user terminal. The vehicle-road collaboration data may be road information, vehicle information, and the like sensed by the roadside sensor unit or another device.

In an embodiment of the disclosure, the roadside sensor unit may include a roadside sensor device (for example, the foregoing camera, radar, infrared or another sensor device), and at least one microservice module configured to process sensor data acquired by the roadside sensor device to obtain the vehicle-road collaboration data. In this embodiment, microservice processing is performed on a processing function in the roadside sensor unit. In this embodiment of the disclosure, at least one microservice module obtained through microservice processing may be used as a part of the vehicle-road collaboration system or as a part of the roadside sensor unit.

In an embodiment of the disclosure, the vehicle-road collaboration system may further include a data exchange gateway deployed in a microservice manner, the data exchange gateway being configured to receive vehicle-road collaboration data transmitted by another device, and forward the vehicle-road collaboration data to the first microservice module. That is, in this embodiment, a microservice module serving as a data exchange gateway is set for the another device, and the data exchange gateway may forward the vehicle-road collaboration data transmitted by the another device to the first microservice module.

In an embodiment of the disclosure, the service system 104 further includes a second microservice module, the second microservice module being configured to receive the data obtained after format conversion by the first microservice module, store the data obtained after the format conversion into a message queue, and according to a subscription request of a message subscriber, select corresponding data from the message queue and return the corresponding data to the message subscriber.

In an embodiment of the disclosure, the service system 104 further includes a third microservice module, the third microservice module being configured to determine a data subscription policy according to a service requirement, and transmit a subscription request to the second microservice module according to the data subscription policy, to obtain corresponding subscription data from the message queue. For example, during prompting of lane-level traffic congestion, because coverage of a single camera is limited, information of a plurality of consecutive cameras along this road may be subscribed according to coverage of the road, and the information is used as an object to determine which lanes on the road are congested.

In an embodiment of the disclosure, the service system 104 further includes a fourth microservice module, the fourth microservice module being configured to obtain the subscription data from the third microservice module, and perform fusion and deduplication processing on data that is detected by a plurality of road monitoring devices (for example, roadside sensors) and that is included in the subscription data, to generate data obtained after the fusion and deduplication processing. For example, because of inconsistent positioning accuracy between a camera, radar or other sensing information, or because of an overlap between consecutive coverage regions of sensors, recognition of some road targets is repeated, resulting in difficulties in scene recognition. Therefore, the fourth microservice module may be used for performing the fusion and deduplication processing on the data.

In an embodiment of the disclosure, the service system 104 further includes a fifth microservice module, the fifth microservice module being configured to obtain the data that is obtained after the fusion and deduplication processing and that is generated by the fourth microservice module, and determine a vehicle-road scene according to the data obtained after the fusion and deduplication processing, for example, determine which positions on a road are in congestion, a level of congestion, which vehicles on the road have an emergency and need to be avoided by the following vehicles, and the like.

In an embodiment of the disclosure, the service system 104 further includes a sixth microservice module, the sixth microservice module being configured to obtain the vehicle-road scene determined by the fifth microservice module, and perform behavior prediction processing on a target object in the vehicle-road scene according to the vehicle-road scene, to obtain a behavior prediction result. For example, which vehicles traveling in the same direction are at risk of collision may be analyzed according to emergency vehicle parking warning information.

In an embodiment of the disclosure, the service system 104 further includes a seventh microservice module, the seventh microservice module being configured to obtain the behavior prediction result from the sixth microservice module, and generate instruction information according to the behavior prediction result, the instruction information including at least one of the following: vehicle control information and path planning information. For example, the vehicle control information may be vehicle lane change control information, or vehicle acceleration and deceleration control information, and the path planning information may be path selection and other information.

In an embodiment of the disclosure, the service system 104 further includes an eighth microservice module, the eighth microservice module being configured to determine an information transmission policy according to a position of and a message type supported by an information receiver, the vehicle-road scene, and a network device deployment status, the information transmission policy being used for transmitting the vehicle-road scene and at least one of the instruction information to the information receiver. In this embodiment of the disclosure, the information transmission policy may include a transmission manner, transmission routing information, and the like.

In an embodiment of the disclosure, the service system 104 further includes a ninth microservice module, the ninth microservice module being configured to encapsulate to-be-transmitted information according to the information transmission policy determined by the eighth microservice module, for a delivery network to transmit encapsulated data to the information receiver. For example, if a road side unit (RSU) device is used for broadcast delivery, the to-be-transmitted information may be encapsulated in a short message format of the RSU device. If a 4G/5G network in a unicast manner is used for distribution, user correlation needs to be received, and targeted encapsulation is performed, to achieve a balance of transmission efficiency, security, and universality.

Figure 4:
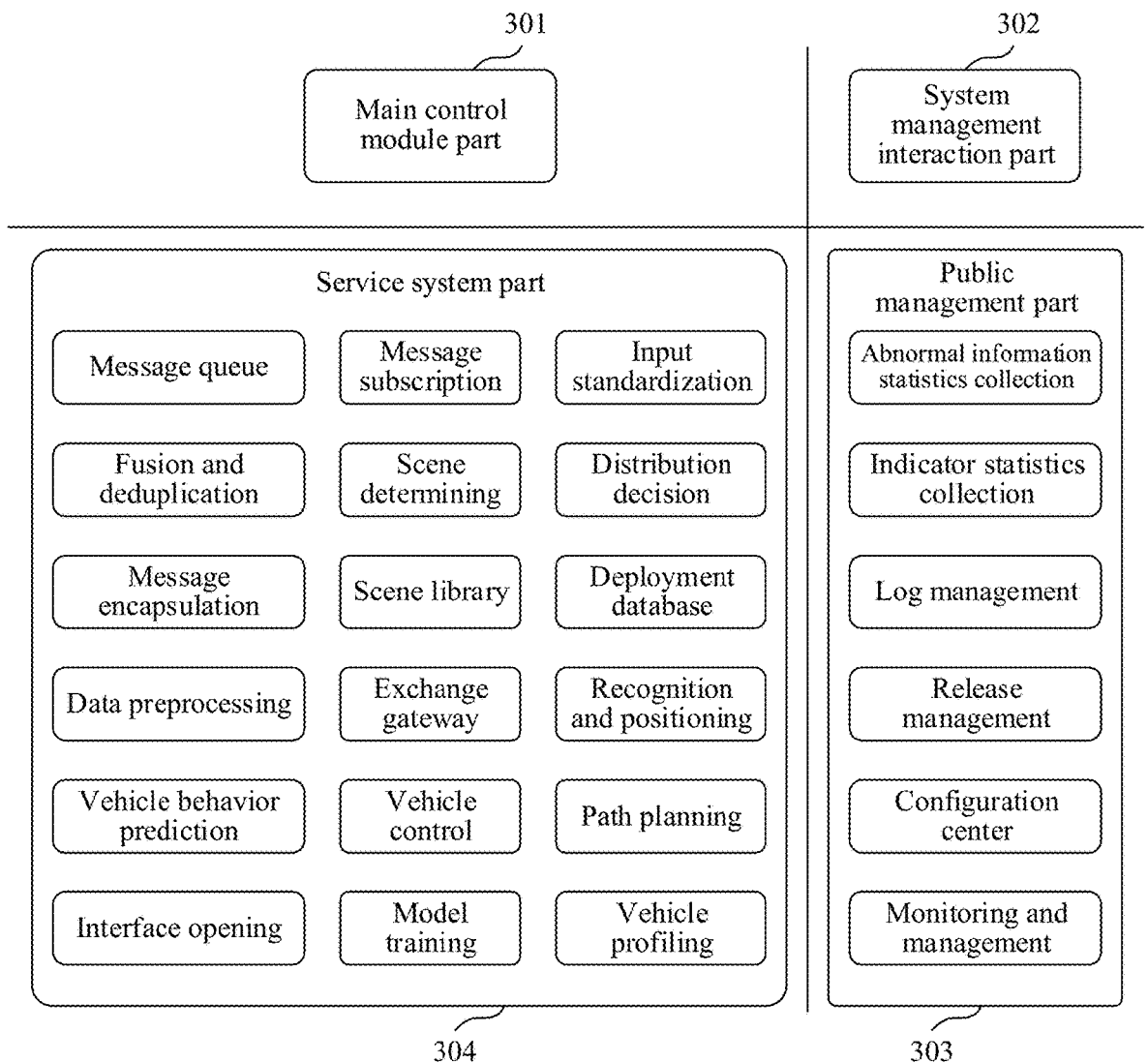
FIG. 4 is a schematic diagram of a division manner of a vehicle-road collaboration system according to an example embodiment of the disclosure.

In an illustrative application scenario of the disclosure, as shown in FIG. 4, a vehicle-road collaboration system may include a main control module 301, a system management interaction part 302, a public management part 303, and a service system part 304.

In an embodiment of the disclosure, the main control module 301 is configured to implement organization and management among various modules of an entire microservice system, and implement management such as registration and monitoring of each module, and scheduling and routing between the modules. The system management interaction part 302 is configured to monitor various real-time data statuses of operation of each microservice module on a human-machine interface, and perform operations such as releasing, starting and stopping, and deploying on the microservice module. The public management part 303 is configured to implement diversified management of the entire microservice system. The service system part 304, including functional modules of the vehicle-road collaboration system, is configured to implement service applications of the vehicle-road collaboration system.

Specifically, the main control module 301 mainly provides operations such as routing address query of the microservice module, information transmission of the microservice module, start and stop control of the microservice module, and management of the microservice module, and is configured to implement registration and discovery of the microservice module according to heartbeat message reported by the microservice module. After being released, each microservice module is registered on the main control module, and registered information includes an interface name and routing information (for example, an IP and port information) of the microservice module. When a specific microservice module is used as a caller and intends to call other microservice modules, the microservice module used as the caller may request interface information and routing information of a called microservice module from the main control module, and the caller may directly initiate interface calling to the called microservice module through the routing information and implement data transmission.

The public management part 303 may implement a variety of management functions. For example, a release management functional module is configured to provide a release function of a microservice module; a configuration center module is configured to provide a function of uniformly managing configuration files of a microservice module; a log management module is configured to provide log functions of recording and log query of a microservice module; the indicator statistics collection module is configured to collect statistics on various call information such as total traffic, average time consumption, memory usage, queue size, cache hit rate, and the like reported by a microservice module, to give an alarm when the microservice module is abnormal; an abnormal information statistics collection module is configured to collect statistics on various abnormal information such as service state change information, database access failure information, and the like reported in a process of processing services, to give an alarm when the microservice module is abnormal; and the monitoring and management module is configured to implement an information display function of a service processing result of a microservice module, for example, a recognition and positioning result of a recognition and positioning module is displayed in this module for query and display.

The service system part 304 mainly divides functional modules for the vehicle-road collaboration system, and implements decoupling between the modules in a microservice manner, thereby achieving efficient and flexible development and deployment. For example, the following microservice modules may be obtained through division: a message queue module, a message subscriber module, an input standardization module, a fusion and deduplication module, a scene determining module, a distribution decision module, a message encapsulation module, a scene library module, a deployment database module, a data preprocessing module, an exchange gateway module, a recognition and positioning module, a vehicle behavior prediction module, a vehicle control module, a path planning module, an interface opening module, a model training module, and a vehicle profiling module. The vehicle-road collaboration system in this embodiment of the disclosure may include all microservice modules of the service system part 304 shown in FIG. 4, or may only include some of the microservice modules.

A processing process of a vehicle-road collaboration system of an embodiment of the disclosure is described below with reference to FIG. 5.

Figure 5:
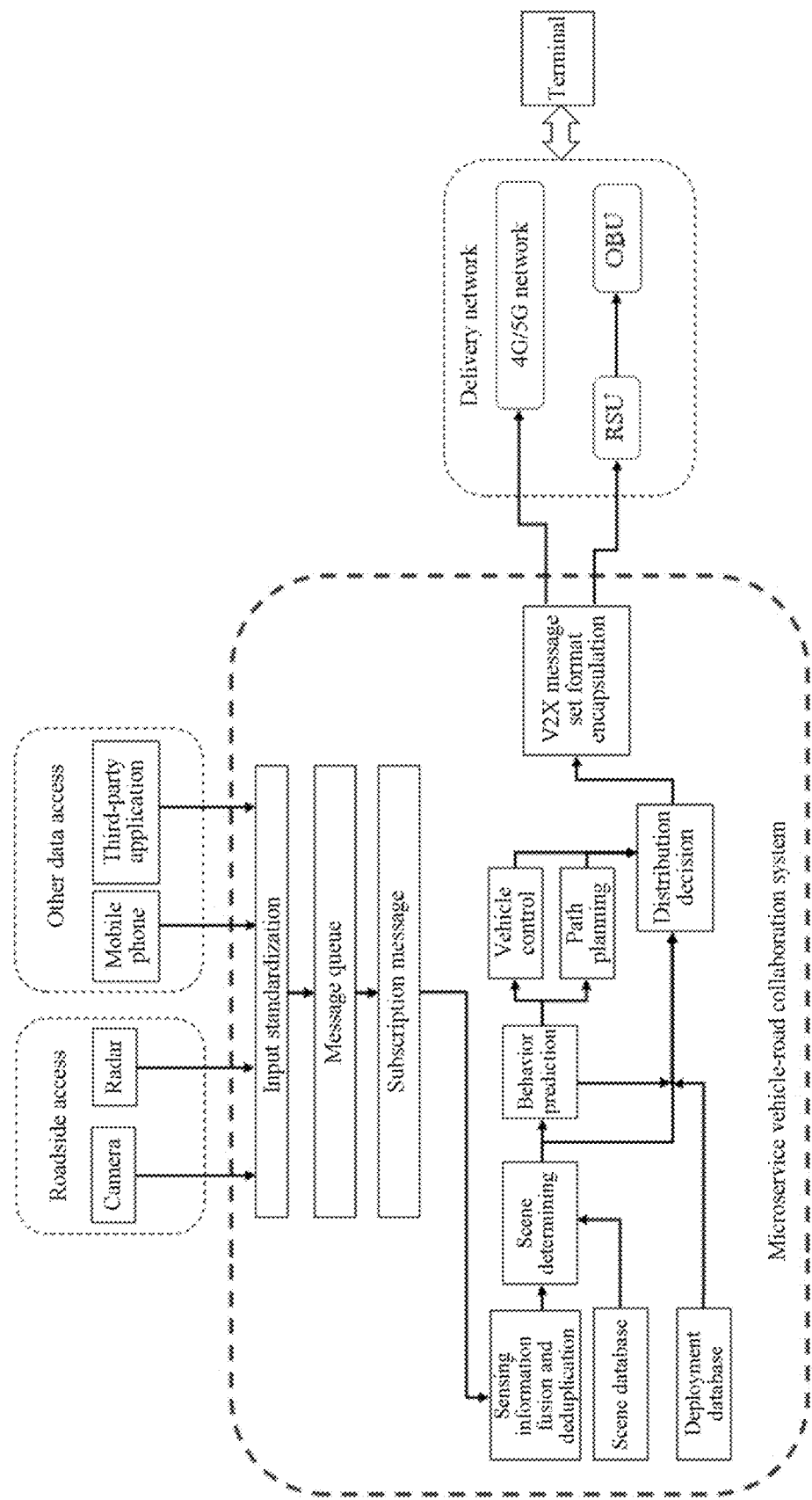
FIG. 5 is a schematic diagram of a processing process of a vehicle-road collaboration system according to an example embodiment of the disclosure.

As shown in FIG. 5, a roadside access part and other data access parts may interact with a microservice vehicle-road collaboration system according to a negotiated message format. Specifically, for example, sensors such as a camera and radar on the roadside access part capture traffic information on a road, perform processing such as recognition and positioning on the information, and transmit the information to the microservice vehicle-road collaboration system according to the message format (for example, a JavaScript Object Notation (JSON) format and a V2X message set format) negotiated with the microservice vehicle-road collaboration system. In another example, after a server side of a mobile phone or a third-party application obtains relevant information, the relevant information may also be transmitted to the microservice vehicle-road collaboration system according to the message format negotiated with the microservice vehicle-road collaboration system.

Each microservice module in the microservice vehicle-road collaboration system may be included in the service system part 304 shown in FIG. 4, and other parts of the entire microservice vehicle-road collaboration system are not shown. The microservice modules in the microservice vehicle-road collaboration system communicate with each other through standard interfaces of a microservice architecture. The interfaces may be a remote procedure call (RPC) interface, a representational state transfer (REST) interface, a transmission control protocol (TCP) interface or a user datagram protocol (UDP) interface, which may be determined by the adopted microservice architecture.

In an embodiment of the disclosure, as shown in FIG. 5, a microservice input standardization module is mainly configured to complete recognition and re-encapsulation of a message inputted from the roadside access part and the other data access part, so that the re-encapsulated data is recognizable in the entire microservice vehicle-road collaboration system and conforms to a message format required by microservice interface transmission.

In an embodiment of the disclosure, after obtaining a re-encapsulated message, the message queue module stores and queues the message in a message queue, takes out a subscribed message according to a subscription rule of a subscription side, and performs subsequent message processing.

In an embodiment of the disclosure, a subscription message module is mainly configured to determine subscription rules according to scenes and algorithm requirements that the entire system needs to process. For example, during prompting of lane-level traffic congestion, because coverage of a single camera is limited, information of a plurality of consecutive cameras along this road may be subscribed according to coverage of the road, and the information is used as an object to determine which lanes on the road are congested. In another example, in a vehicle emergency parking warning scene, a road section with relatively high speed requires very low latency message processing. Therefore, some specific or predictive algorithms for this scene often subscribe to subsequent sensing device information of the road section according to some of abnormalities (for example, obvious deceleration) that have been sensed by a roadside sensing device before, to speed up a process of scene recognition.

In an embodiment of the disclosure, a sensing information fusion and deduplication module is used because of inconsistency of positioning accuracy between a camera, radar or other inputted information, or because of an overlap between respective consecutive coverage regions, in this case, recognition of some road targets is repeated, resulting in difficulties in scene recognition. Therefore, redundant and repeated sensing result information is filtered out through appropriate algorithm design, which is very important for scene determining and reliability of sensing information.

In an embodiment of the disclosure, a scene determining module is mainly configured to determine a road scene according to roadside information obtained after fusion and deduplication and an input of other information (for example, a scene database), for example, which positions on a road are in congestion, a level of congestion, which vehicles on the road have an emergency and need to be avoided by the following vehicles, and the like. In some scenes, for example, the foregoing vehicle emergency parking warning scene, the module may also be required to feed back information to a subscription message module to obtain sensing information in a targeted manner and speed up a determining processing of a scene recognition message. During deployment, to increase scalability of the algorithm, an independent scene database may be used as an input of the scene determining, to complete the scene determining together.

In an embodiment of the disclosure, a behavior prediction module is mainly configured to make a behavior prediction of a road target according to a result of the scene determining, and provide a basis for a possible control decision. Meanwhile, vehicle control and path planning are also obtained based on a prediction result of the behavior prediction module. For example, according to the foregoing emergency vehicle parking warning information, which vehicles traveling in the same direction are at risk of collision is analyzed, and decision information such as lane change, deceleration, and path selection is calculated based on the risks.

In an embodiment of the disclosure, a distribution decision module is configured to select the most efficient transmission manner and transmission route according to, in a recognized scene, a position of a receiving vehicle and a support type of a receiving terminal, as well as deployment information (for example, an RSU deployment position and a 4G/5G network deployment state) provided in a deployment database of the entire vehicle-road collaboration system, and transmit a scene recognition result and information about path planning and vehicle control.

In an embodiment of the disclosure, a V2X message set format encapsulation module is mainly configured to encapsulate and deliver a V2X message in a targeted manner for different distribution decision policies. For example, if an RSU device is used for broadcast delivery, short message format encapsulation of the RSU device is performed. If a 4G/5G network in a unicast manner is used for distribution, user correlation needs to be received, and targeted encapsulation is performed, to achieve a balance of transmission efficiency, security, and universality.

In an embodiment of the disclosure, a delivery network mainly transmits, through the 4G/5G network or an RSU/on-board unit (OBU) device, vehicle-road collaboration information obtained through calculation by the system to a terminal, to provide the terminal with sensing, decision-making and corresponding control information.

Figure 6:
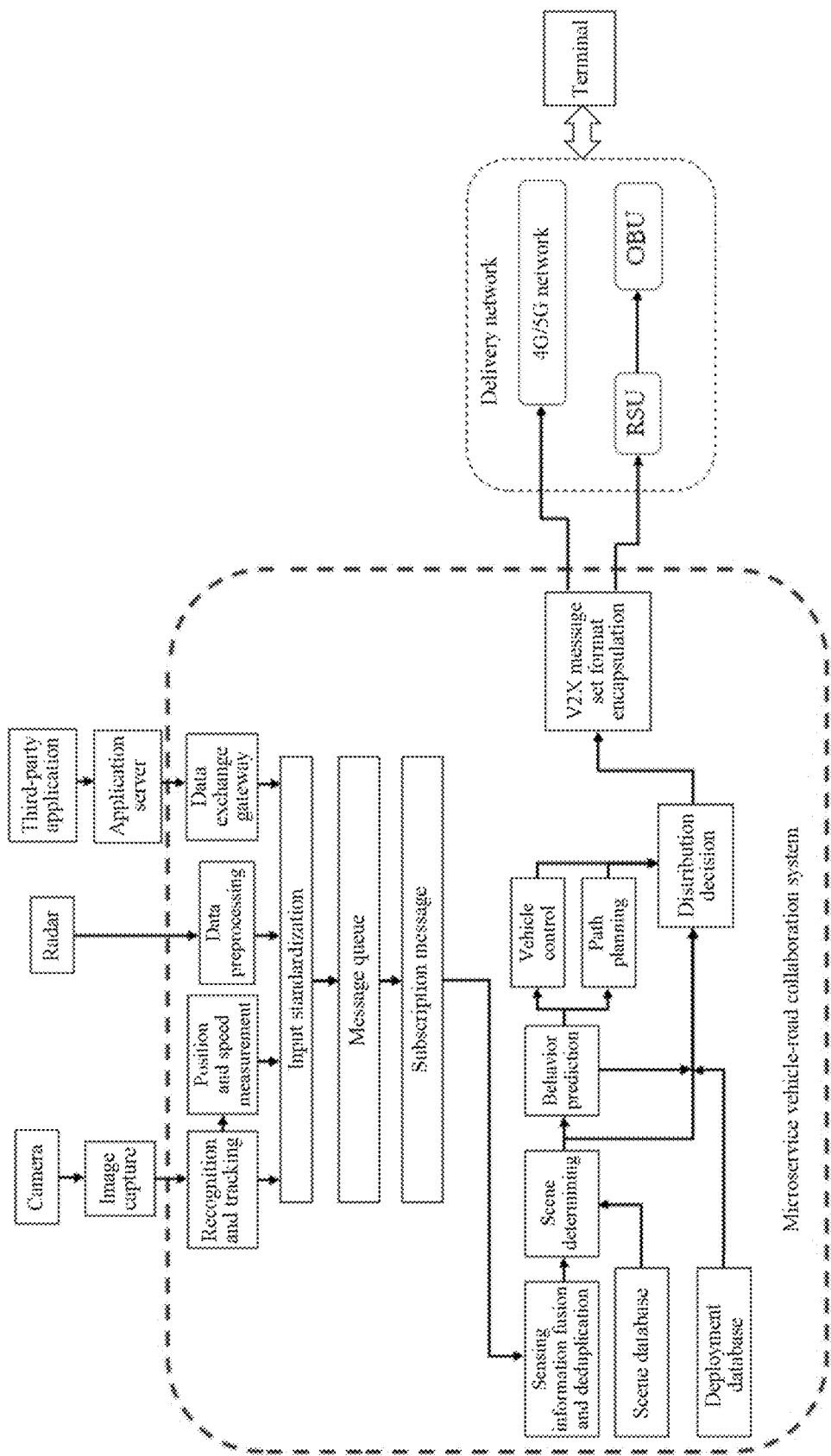
FIG. 6 is a schematic diagram of a processing process of a vehicle-road collaboration system according to another example embodiment of the disclosure.

FIG. 6 is a schematic diagram of a processing process of a vehicle-road collaboration system according to another example embodiment of the disclosure. Based on a system architecture shown in FIG. 6, the embodiments of the disclosure further provide an embodiment similar to that shown in FIG. 5, and a difference between this embodiment and the embodiment shown in FIG. 5 is that: in the system shown in FIG. 5, some functional modules of a to-be-accessed road monitoring device (including a vehicle-road collaboration participant of a third-party application) are also based on microservice, and are a part of the entire microservice vehicle-road collaboration system. For example, in a process of inputting sensing information, for an input of sensing information of a camera, recognition and tracking and position and speed measurement that are used as independent microservice modules may be regarded as a part of the entire system. For radar, information sensed by the radar may also be processed in a microservice preprocessing module to obtain a vehicle position and other information sensed by the radar. The third-party application often interacts with a cloud server thereof. To obtain sensing information of the third-party application, a specific microservice data exchange gateway may be generated to access the sensing information of the third-party application to the entire vehicle-road collaboration system.

The microservice system architecture adopted in the embodiments of the disclosure may be built on an open source framework, or may be an architecture specifically developed for a vehicle-road collaboration system. In addition, a microservice division manner of the service system part in the vehicle-road collaboration system is merely an example. In actual deployment, each module may be further subdivided, or a plurality of modules may be combined into one module. Moreover, some modules of sensing information providers from the roadside access part and other data input may be used as microservice modules or may not be used as microservice modules, or some of the modules are used as microservice modules while some others are not used as microservice modules, which has high flexibility.

Figure 7:
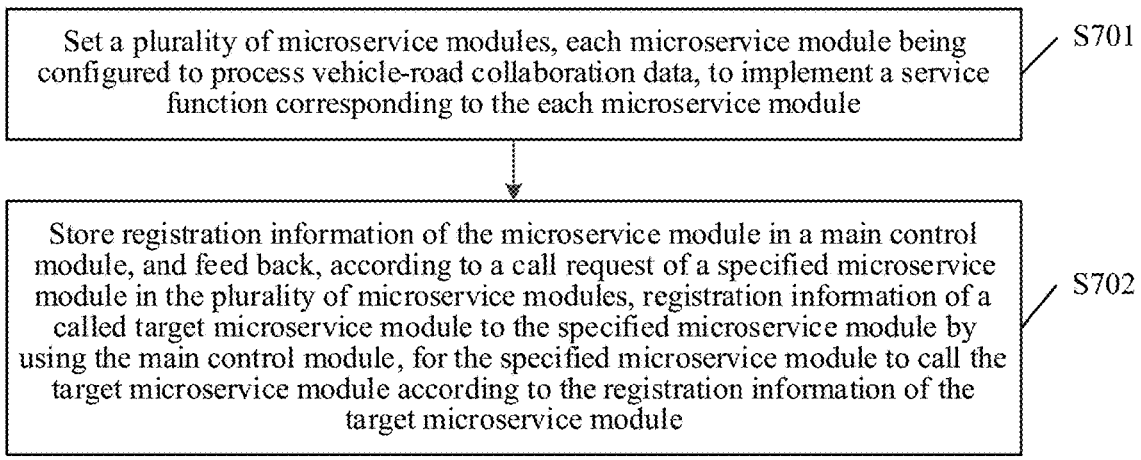
FIG. 7 is a schematic flowchart of a vehicle-road collaboration method according to an example embodiment of the disclosure.

FIG. 7 is a schematic flowchart of a vehicle-road collaboration method according to an embodiment of the disclosure. Referring to FIG. 7, the vehicle-road collaboration method is performed by an electronic device and includes the following operations.

Operation S701. Set a plurality of microservice modules, each microservice module being configured to process vehicle-road collaboration data, to implement a service function corresponding to each microservice module.

Operation S702. Store registration information of the microservice module in a main control module, and feed back, according to a call request of a specified microservice module in the plurality of microservice modules, registration information of a called target microservice module to the specified microservice module by using the main control module, for the specified microservice module to call the target microservice module according to the registration information of the target microservice module.

In this embodiment of the disclosure, the storing registration information of the microservice module in a main control module includes: storing the registration information of the microservice module in the main control module in a case of receiving a registration request of the microservice module, the registration information including interface information and routing information of the microservice module.

In this embodiment of the disclosure, the method further includes setting at least one of the following functional modules: a release management functional module, configured to manage release of the microservice module; a configuration center module, configured to manage a configuration file of the microservice module; a log management module, configured to provide functions of log recording and log query of the microservice module; an indicator statistics collection module, configured to collect statistics on call state information detected by the microservice module; an abnormal information statistics collection module, configured to collect statistics on abnormal information detected by the microservice module; and a monitoring and management module, configured to display a service processing result of the microservice module.

In this embodiment of the disclosure, the setting a plurality of microservice modules includes: setting a first microservice module for data standardization processing, the first microservice module being configured to obtain vehicle-road collaboration data transmitted by a road monitoring device, and convert a format of the vehicle-road collaboration data into a supported data format.

In this embodiment of the disclosure, the setting a plurality of microservice modules further includes: setting a second microservice module, the second microservice module being configured to receive the data obtained after format conversion by the first microservice module, store the data obtained after the format conversion into a message queue, and according to a subscription request of a message subscriber, select corresponding data from the message queue and return the corresponding data to the message subscriber.

In this embodiment of the disclosure, the setting a plurality of microservice modules further includes: setting a third microservice module, the third microservice module being configured to determine a data subscription policy according to a service requirement, and transmit a subscription request to the second microservice module according to the data subscription policy, to obtain corresponding subscription data from the message queue.

In this embodiment of the disclosure, the setting a plurality of microservice modules further includes: setting a fourth microservice module, the fourth microservice module being configured to obtain the subscription data from the third microservice module, and perform fusion and deduplication processing on data that is detected by the road monitoring device and that is included in the subscription data, to generate data obtained after the fusion and deduplication processing.

In this embodiment of the disclosure, the setting a plurality of microservice modules further includes: setting a fifth microservice module, the fifth microservice module being configured to obtain the data that is obtained after the fusion and deduplication processing and that is generated by the fourth microservice module, and determine a vehicle-road scene according to the data obtained after the fusion and deduplication processing.

In this embodiment of the disclosure, the setting a plurality of microservice modules further includes: setting a sixth microservice module, the sixth microservice module being configured to obtain the vehicle-road scene determined by the fifth microservice module, and perform behavior prediction processing on a target object in the vehicle-road scene according to the vehicle-road scene, to obtain a behavior prediction result.

In this embodiment of the disclosure, the setting a plurality of microservice modules further includes: setting a seventh microservice module, the seventh microservice module being configured to obtain the behavior prediction result from the sixth microservice module, and generate instruction information according to the behavior prediction result, the instruction information including at least one of the following: vehicle control information and path planning information.

In this embodiment of the disclosure, the setting a plurality of microservice modules further includes: setting an eighth microservice module, the eighth microservice module being configured to determine an information transmission policy according to a position of and a message type supported by an information receiver, the vehicle-road scene, and a network device deployment status, the information transmission policy being used for transmitting the vehicle-road scene and at least one of the instruction information to the information receiver.

In this embodiment of the disclosure, the setting a plurality of microservice modules further includes: setting a ninth microservice module, the ninth microservice module being configured to encapsulate to-be-transmitted information according to the information transmission policy determined by the eighth microservice module, for a delivery network to transmit encapsulated data to the information receiver.

In this embodiment of the disclosure, the method further includes: performing, by the main control module, start and stop management on each microservice module, and updating stored registration information of each microservice module according to a heartbeat message of each microservice module.

An embodiment of the disclosure further provides an electronic device, including a processor and a memory, the memory being configured to store a computer program, and the processor being configured to execute the computer program to implement the vehicle-road collaboration method according to the foregoing embodiments.

The microservice solution provided in the foregoing embodiments of the disclosure may realize efficient and rapid deployment of the vehicle-road collaboration system, effective and diverse service governance (for example, load balancing and fault-tolerant protection), and compatibility with third parties and various types of sensing information input, which has high system scalability and compatibility. Meanwhile, because the microservice vehicle-road collaboration system modularizes service functions, decoupling of development and testing is achieved, which is beneficial to efficient development of the development and testing. In addition, microservice service functional modules in the vehicle-road collaboration system in the embodiments of the disclosure may achieve a good balance between efficient message transmission and invocation, system compatibility and scalability, and efficiency of development, testing and deployment.

Figure 8:
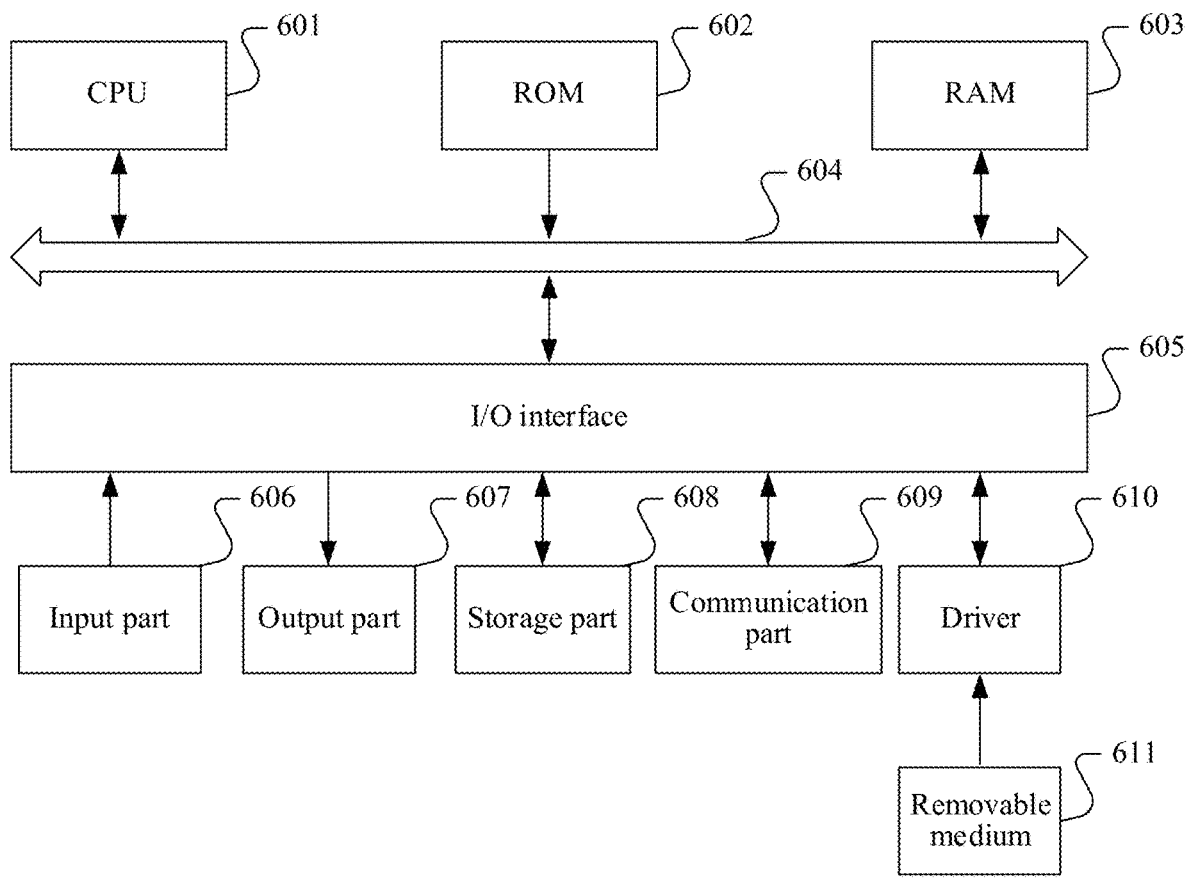
FIG. 8 is a schematic structural diagram of a computer system of an electronic device according to an example embodiment of the disclosure.

FIG. 8 is a schematic structural diagram of a computer system of an electronic device configured to implement the technical solutions of the embodiments of the disclosure. The computer system may implement the vehicle-road collaboration system described in the foregoing embodiments.

A computer system 600 of the electronic device shown in FIG. 8 is merely an example, and does not constitute any limitation on functions and use ranges of the embodiments of the disclosure.

As shown in FIG. 8, the computer system 600 includes a central processing unit (CPU) 601, which may perform various suitable actions and processing based on a program stored in a read-only memory (ROM) 602 or a program loaded from a storage part 608 into a random access memory (RAM) 603, for example, perform the method described in the foregoing embodiments. The RAM 603 further stores various programs and data to be used for system operations. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, or the like; an output part 607 including a cathode ray tube (CRT), a liquid crystal display (LCD), a speaker, or the like; a storage part 608 including a hard disk, or the like; and a communication part 609 including a network interface card such as a local area network (LAN) card or a modem. The communication part 609 performs communication processing by using a network such as the Internet. A drive 610 is also connected to the I/O interface 605 as required. A removable medium 611, such as a magnetic disk, an optical disc, a magneto-optical disk, or a semiconductor memory, is mounted on the driver 610 as required, so that a computer program read from the removable medium is installed into the storage part 608 as required.

In technical solutions provided in some embodiments of the disclosure, a service system in a vehicle-road collaboration system includes a plurality of microservice modules, and each microservice module is configured to process vehicle-road collaboration data to implement a corresponding service function, so that efficient and rapid deployment of the vehicle-road collaboration system may be achieved in a microservice deployment manner, and effective and diverse service governance (for example, load balancing and fault-tolerant protection) may be achieved, thereby improving the scalability and the compatibility of the system. Meanwhile, decoupling of development and testing may be implemented by modularizing the service system through a microservice manner, which is beneficial to efficient development of the development and testing.

According to the embodiments of the disclosure, a processing process of microservice modules in the foregoing embodiments may be implemented as computer software programs. For example, the embodiments of the disclosure include a computer program product. The computer program product includes a computer program stored on a computer-readable medium. The computer program includes computer program instructions used for performing the processing process of the microservice modules. In such an embodiment, the computer program may be downloaded and installed from the network through the communication portion 609, and/or installed from the removable medium 611. When the computer program is read from the computer-readable medium and executed by the CPU 601 in a computer device, the various functions defined in the vehicle-road collaboration system of this embodiment of the disclosure and various steps in the vehicle-road collaboration method are executed.

The computer-readable medium according to example embodiments of the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or device, or any combination thereof. A more specific example of the computer-readable storage medium may be a volatile or non-volatile computer-readable storage medium, including but not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, apparatus, or device. In the disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof. In the embodiments of the disclosure, the computer storage medium stores a computer program, the computer program includes program instructions, the program instructions, when executed by one or more processors, performing the vehicle-road collaboration method according to the example embodiments of the disclosure.

The flowcharts and block diagrams in the accompanying drawings illustrate possible system architectures, functions, and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of the disclosure may be implemented in a software manner, or may be implemented in a hardware manner, and the unit described may also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the processing process of the microservice modules described in the foregoing embodiments.

Although several modules or units of a device for action execution are mentioned in the foregoing detailed descriptions, the division is not mandatory. According to example embodiments of the disclosure, the features and functions of two or more modules or units described above may be specified in one module or unit. Conversely, features and functions of one module or unit described above may be further divided into a plurality of modules or units to be specified.

Through the descriptions of the foregoing implementations, a person skilled in the art would easily understand that the example implementations described herein may be implemented through software, or may be implemented through software located in combination with necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of the disclosure.

After considering the specification and practicing the disclosed embodiments, a person skilled in the art may easily conceive of other implementations of the disclosure. The disclosure is intended to cover any variations, uses, or adaptive changes of the disclosure following the general principles of the disclosure, and includes well-known knowledge and conventional technical means in the art and undisclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A vehicle-road collaboration apparatus, comprising:
    a service system comprising a plurality of microservice modules, each microservice module being configured to process vehicle-road collaboration data, to implement a service function corresponding to each microservice module; and
    a main control module configured to store registration information of a microservice module, and provide, based on a call request of a certain microservice module in the plurality of microservice modules, registration information of a requested target microservice module to the certain microservice module,
    wherein the certain microservice module is configured to call the target microservice module based on the registration information of the target microservice module.

2. The vehicle-road collaboration apparatus according to claim 1, wherein the main control module is configured to store the registration information of the microservice module based on receiving a registration request of the microservice module, the registration information comprising interface information and routing information of the microservice module.

3. The vehicle-road collaboration apparatus according to claim 1, further comprising a management system, the management system comprising at least one of the following modules:
    a release management functional module, configured to manage release of the microservice module;
    a configuration center module, configured to manage a configuration file of the microservice module;
    a log management module, configured to provide functions of log recording and log query of the microservice module;
    an indicator statistics collection module, configured to collect statistics on call state information detected by the microservice module;
    an abnormal information statistics collection module, configured to collect statistics on abnormal information detected by the microservice module; and
    a monitoring and management module, configured to display a service processing result of the microservice module.

4. The vehicle-road collaboration apparatus according to claim 1, wherein the service system comprises a first microservice module, the first microservice module being configured to obtain the vehicle-road collaboration data from a road monitoring device, and convert a format of the vehicle-road collaboration data into a data format supported by the service system.

5. The vehicle-road collaboration apparatus according to claim 4, wherein the first microservice module is configured to process sensor data acquired by the road monitoring device to obtain the vehicle-road collaboration data.

6. The vehicle-road collaboration apparatus according to claim 5, wherein the service system further comprises a second microservice module, the second microservice module being configured to store data obtained after format conversion into a message queue, and based on a subscription request of a message subscriber, select corresponding data from the message queue and return the corresponding data to the message subscriber.

7. The vehicle-road collaboration apparatus according to claim 6, wherein the service system further comprises a third microservice module, the third microservice module being configured to determine a data subscription policy according to a service requirement, and transmit a subscription request to the second microservice module according to the data subscription policy, to obtain corresponding subscription data from the message queue.

8. The vehicle-road collaboration apparatus according to claim 7, wherein the service system further comprises a fourth microservice module, the fourth microservice module being configured to perform fusion and deduplication processing on data that is detected by the road monitoring device and that is included in the subscription data.

9. The vehicle-road collaboration apparatus according to claim 8, wherein the service system further comprises a fifth microservice module, the fifth microservice module being configured to determine a vehicle-road scene based on data obtained after the fusion and deduplication processing.

10. The vehicle-road collaboration apparatus according to claim 9, wherein the service system further comprises a sixth microservice module, the sixth microservice module being configured to perform behavior prediction processing on a target object in the vehicle-road scene according to the vehicle-road scene, to obtain a behavior prediction result.

11. The vehicle-road collaboration apparatus according to claim 10, wherein the service system further comprises a seventh microservice module, the seventh microservice module being configured to generate instruction information according to the behavior prediction result, the instruction information comprising at least one of the following: vehicle control information and path planning information.

12. The vehicle-road collaboration apparatus according to claim 11, wherein the service system further comprises an eighth microservice module, the eighth microservice module being configured to determine an information transmission policy according to a position of and a message type supported by an information receiver, the vehicle-road scene, and a network device deployment status, the information transmission policy being used for transmitting the vehicle-road scene and at least one of the instruction information to the information receiver.

13. The vehicle-road collaboration apparatus according to claim 12, wherein the service system further comprises a ninth microservice module, the ninth microservice module being configured to encapsulate to-be-transmitted information according to the information transmission policy determined by the eighth microservice module, for a delivery network to transmit the encapsulated information to the information receiver.

14. The vehicle-road collaboration apparatus according to claim 4, further comprising a data exchange gateway deployed in a microservice manner, the data exchange gateway being configured to receive the vehicle-road collaboration data from another device, and forward the vehicle-road collaboration data to the first microservice module.

15. The vehicle-road collaboration apparatus according to claim 1, wherein the main control module is further configured to perform start and stop management on each microservice module, and update the stored registration information of each microservice module according to a heartbeat message of each microservice module.

16. A vehicle-road collaboration method, performed by an electronic device, the method comprising:
    setting a plurality of microservice modules, each microservice module being configured to process vehicle-road collaboration data, to implement a service function corresponding to each microservice module; and
    storing registration information of the microservice module in a main control module, and providing, based on a call request of a certain microservice module in the plurality of microservice modules, registration information of a requested target microservice module to the certain microservice module by using the main control module, wherein the certain microservice module is configured to call the target microservice module based on the registration information of the target microservice module.

17. The vehicle-road collaboration method according to claim 16, wherein the setting the plurality of microservice modules comprises setting a first microservice module, the first microservice module being configured to obtain the vehicle-road collaboration data from a road monitoring device, and convert a format of the vehicle-road collaboration data into a supported data format.

18. The vehicle-road collaboration method according to claim 17, wherein the setting the plurality of microservice modules further comprises setting a second microservice module, the second microservice module being configured to store data obtained after format conversion into a message queue, and based on a subscription request of a message subscriber, select corresponding data from the message queue and return the corresponding data to the message subscriber.

19. The vehicle-road collaboration method according to claim 18, wherein the setting the plurality of microservice modules further comprises setting a third microservice module, the third microservice module being configured to determine a data subscription policy according to a service requirement, and transmit a subscription request to the second microservice module according to the data subscription policy, to obtain corresponding subscription data from the message queue.

20. A non-transitory computer-readable storage medium, storing a computer program, the computer program comprising program instructions, the program instructions, when executed by one or more processors, causing the one or more processors to perform:

setting a plurality of microservice modules, each microservice module being configured to process vehicle-road collaboration data, to implement a service function corresponding to each microservice module; and storing registration information of the microservice module in a main control module, and providing, based on a call request of a certain microservice module in the plurality of microservice modules, registration information of a requested target microservice module to the certain microservice module by using the main control module, wherein the certain microservice module is configured to call the target microservice module based on the registration information of the target microservice module.

* * * * *